(12) United States Patent
Toniolo et al.

(10) Patent No.: US 7,044,023 B2
(45) Date of Patent: May 16, 2006

(54) KNOB WITH DIFFERENT GEAR RATIOS

(75) Inventors: Alessandro Toniolo, Torre (IT);
Stefano Zanella, Montebelluna (IT);
Silvano Zanon, Padua (IT)

(73) Assignee: Sit La Precisa S.p.A., Padua (IT)

( * ) Notice: Subject to any disclaimer, the term of this patent is extended or adjusted under 35 U.S.C. 154(b) by 107 days.

(21) Appl. No.: 10/332,881

(22) PCT Filed: Jul. 3, 2001

(86) PCT No.: PCT/EP01/07600

§ 371 (c)(1),
(2), (4) Date: Oct. 7, 2003

(87) PCT Pub. No.: WO02/06712

PCT Pub. Date: Jan. 24, 2002

(65) Prior Publication Data

US 2004/0055414 A1   Mar. 25, 2004

(30) Foreign Application Priority Data

Jul. 14, 2000   (IT) .......................... PD2000A0185

(51) Int. Cl.
*F16H 33/00* (2006.01)
*F16K 31/44* (2006.01)
*F02M 37/04* (2006.01)

(52) U.S. Cl. .......................... 74/640; 74/10.8; 251/48; 122/504; 236/1 R

(58) Field of Classification Search ........ 475/164–166, 475/169; 74/10.8, 640; 251/248–250.5; 122/504; 236/1 R
See application file for complete search history.

(56) References Cited

U.S. PATENT DOCUMENTS

| | | | | |
|---|---|---|---|---|
| 2,164,029 A | * | 6/1939 | Borland | 116/153 |
| 2,313,183 A | * | 3/1943 | Trbojevich | 475/336 |
| 2,470,582 A | * | 5/1949 | Seasongood | 116/309 |
| 2,567,585 A | * | 9/1951 | Wagenknecht et al. | 74/10.8 |
| 4,054,966 A | * | 10/1977 | Putsch et al. | 16/324 |
| 4,171,649 A | * | 10/1979 | Lindsay | 74/416 |
| 4,326,748 A | * | 4/1982 | Brusasco | 297/362 |
| 4,512,531 A | * | 4/1985 | Tunoda | 242/241 |
| 4,991,461 A | * | 2/1991 | Sennett et al. | 74/553 |
| 6,471,135 B1 | * | 10/2002 | Paolucci | 236/102 |
| 6,745,725 B1 | * | 6/2004 | Toniolo et al. | 122/504 |

FOREIGN PATENT DOCUMENTS

| | | |
|---|---|---|
| DE | 33 36 386 | 4/1985 |
| JP | 02038782 | 2/1990 |
| JP | 03181707 | 8/1991 |

OTHER PUBLICATIONS

International Search Report Dated Oct. 11, 2001.

* cited by examiner

*Primary Examiner*—Tisha Lewis
(74) *Attorney, Agent, or Firm*—RatnerPrestia

(57) ABSTRACT

A knob adjustment device particularly for adjusting the temperature in valve units for water-heating apparatus. The device comprises a geared transmission interposed between the knob and an operating member of the valve unit in order to transmit a rotary movement to the member about its own axis as a result of a rotation of the knob. The geared transmission includes a reduction mechanism with a variable transmission ratio such that, for a first angular portion and a second angular portion of the rotation of the knob, the member is rotated with respective different transmission ratios ($T_1, T_2$).

8 Claims, 3 Drawing Sheets

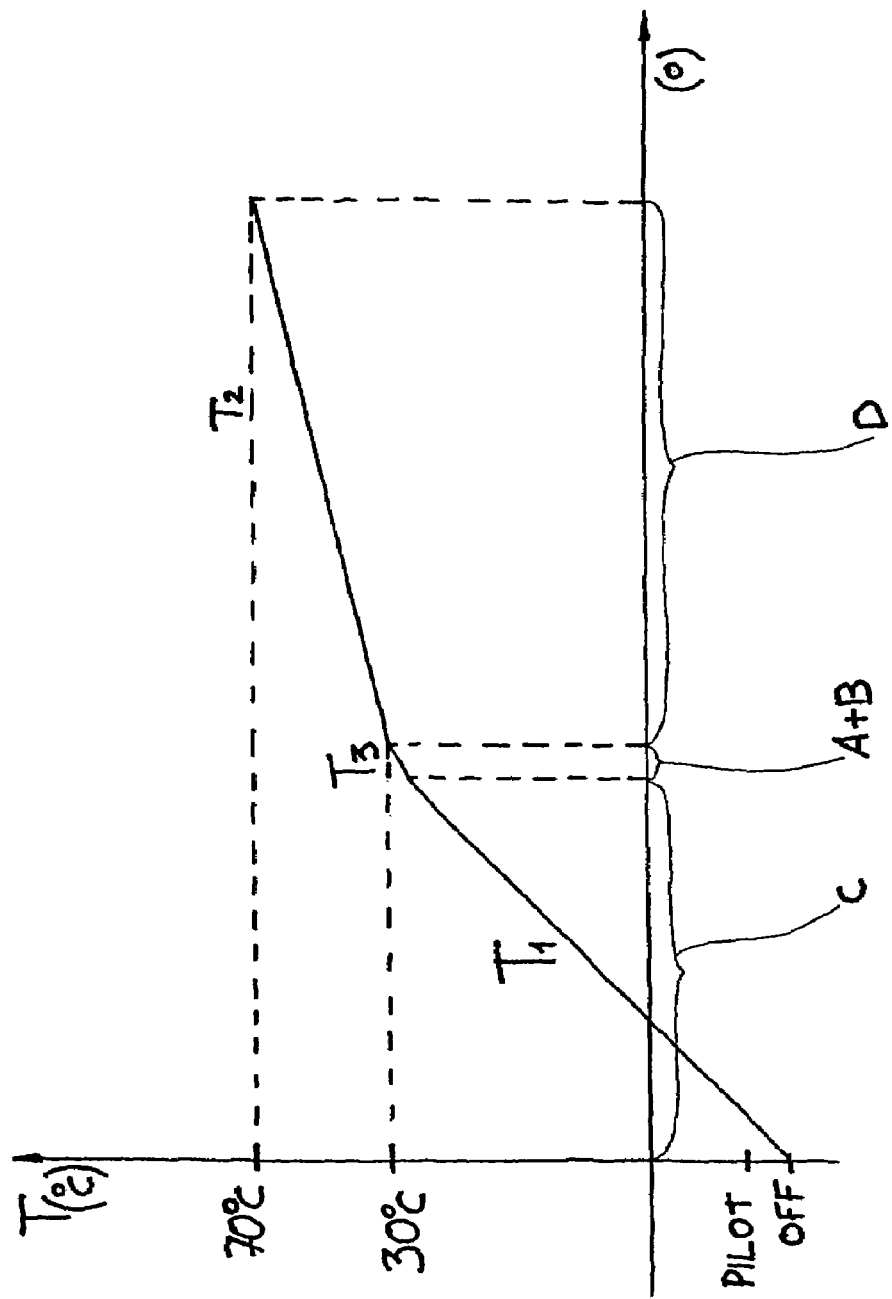

KNOB WITH DIFFERENT GEAR RATIOS

This application is a U.S. national-phase application of PCT International Application No. PCT/EP01/07600.

TECHNICAL FIELD

The present invention relates to a knob adjustment device, particularly for temperature adjustment in water-heating apparatus. The invention relates, in particular but not exclusively, to the field of water-heating apparatus such as, for example, a domestic water-heater having a thermostatic valve unit with a knob adjustment device for adjusting the temperature to which the water is to be heated.

BACKGROUND ART

In these units it is desirable to operate with a single valve seat associated with a respective closure element which has both the function of shutting off the gas flow (ON/OFF) and the function of adjusting the flow to achieve the water temperature desired by the user. In this connection, the valve unit has a knob adjustment device operatively connected to the closure element by a control member with which the user can enable the function of lighting a pilot burner or of shutting off the gas-flow (OFF) and, in addition, can select a preselected water-temperature value.

When the above-mentioned functions are incorporated in a single device, it is also desirable to be able to perform these functions at most by a single rotation of the knob, in order to achieve quicker and easier use by the user. However, in addition to the angular temperature-selection band (normally an adjustment within the range between approximately 30° C. and 70° C. is required), it is therefore necessary also to provide an angular band on the knob for regulating the shut-off (OFF) and pilot-burner lighting points. This therefore reduces the angular band available for temperature selection, which translates into a lower degree of resolution within the above-mentioned range of between approximately 30° C. and 70° C. such that the user cannot adjust the temperature with a sensitivity, for example, with variations on the order of one degree centigrade in the preselected temperature values.

The problem which the present invention solves is that of providing a knob adjustment device which is designed structurally and functionally so as to overcome the disadvantages explained with reference to the prior art mentioned.

BRIEF DESCRIPTION OF DRAWINGS

The characteristics and the advantages of the invention will become clearer from the following detailed description of a preferred embodiment thereof, described by way of non-limiting example, with reference to the appended drawings, in which:

FIG. 4 is a graph showing the rules governing temperature variation as a function of the angular rotation of the knob device of the previous figures.

DETAILED DESCRIPTION OF THE INVENTION

Figure 1:
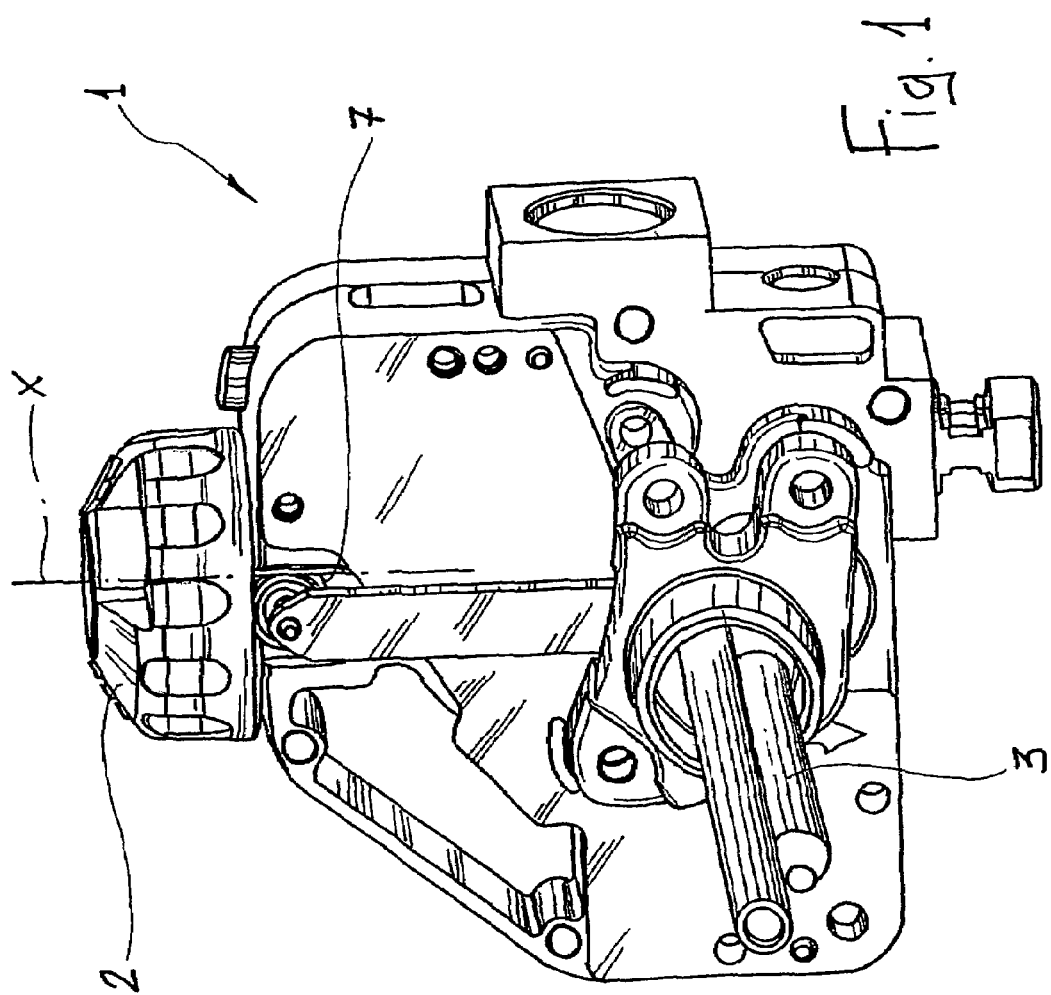
FIG. 1 is a schematic perspective view of a valve unit equipped with a knob adjustment device formed in accordance with the present invention.
Figure 2:
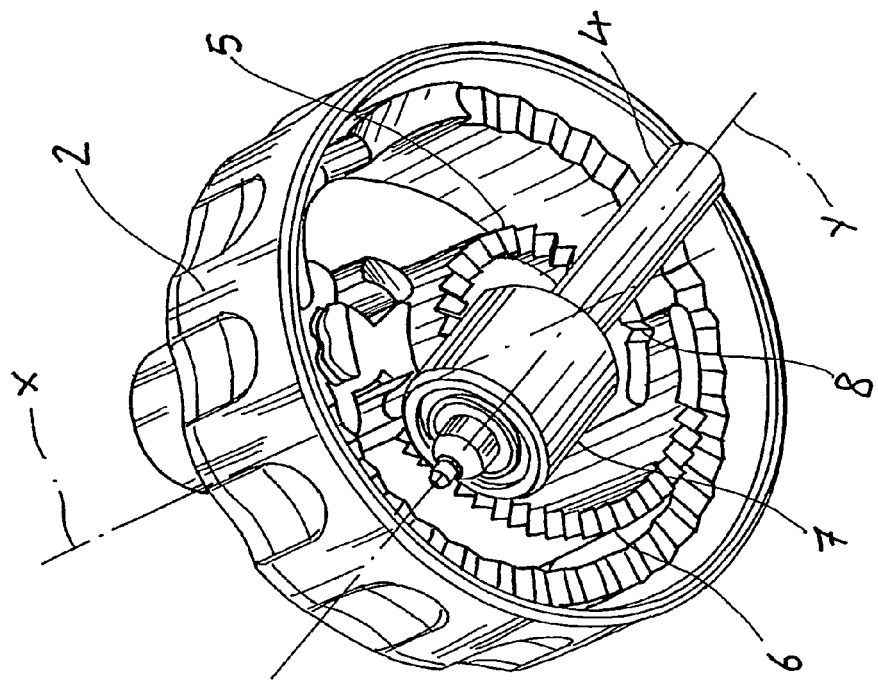
FIGS. 2 and 3 are a perspective view and a plan view from below, of the knob adjustment device of FIG. 1, respectively.

With reference to FIG. 1, a valve unit, generally indicated 1, is equipped with a knob adjustment device 2 formed in accordance with the invention. In the embodiment described, the valve unit 1 is of the thermostatic type and is intended mainly for the adjustment and control of the water temperature in heating apparatus, for example, in domestic water-heaters. However, the device according to the invention is intended also to be usable in other fields, although the field indicated represents a preferred selection.

The valve unit 1 has an element 3 sensitive to the variation of the water temperature and operatively connected to a closure element, not shown, in order to cause the latter to close/open a respective valve seat, also not shown, inside the valve unit 1.

The knob 2 is mounted so as to be rotatable on the valve unit 1 about a rotation axis X and is kinematically connected, by a geared transmission system, to an operating member 4, also supported so as to be rotatable on the valve unit 1, about a rotation axis Y. The axes X and Y are perpendicular to one another.

The operating member 4 is in turn associated with an actuator of conventional type which acts on the closure element of the valve unit 1 in order to perform the functions of shutting off the main flow of gas through the valve unit 1 as well as of adjusting the temperature value by the thermostatic closure of the respective valve seat when the preselected temperature set by the user is exceeded.

More particularly, the functions of temperature adjustment, of enabling a pilot burner associated with the heating apparatus to be lit, as well as of completely shutting off the gas flow (OFF point) supplied to the valve unit 1, are combined in the knob 2.

In the knob 2, the geared transmission system is intended to transmit a rotary movement to the operating member 4, about its own axis Y, as a result of a rotation of the knob 2 about the axis X.

The geared transmission system is of the crown-wheel and pinion type and comprises a pair of coaxial crown wheel sectors 5, 6 fixed for rotation with the knob 2, as well as a pinion 7, coaxial and fixed for rotation with the operating member 4, and capable of meshing with the crown wheel sectors 5, 6.

The crown wheel sectors 5, 6 are of the type with face teeth and extend concentrically substantially as extensions of one another but having different respective diameters.

The sectors 5, 6 are also spaced apart circumferentially in a manner such that the pinion 7 meshes alternatively with one or other of the crown wheel sectors 5, 6.

Moreover, an intermediate tooth 8 (or several teeth), interposed between the crown wheel sectors 5, 6 and extending concentrically with the sectors 5, 6 along an arc having a diameter between the diameters of the sectors, can also mesh with the pinion 7.

Figure 3:
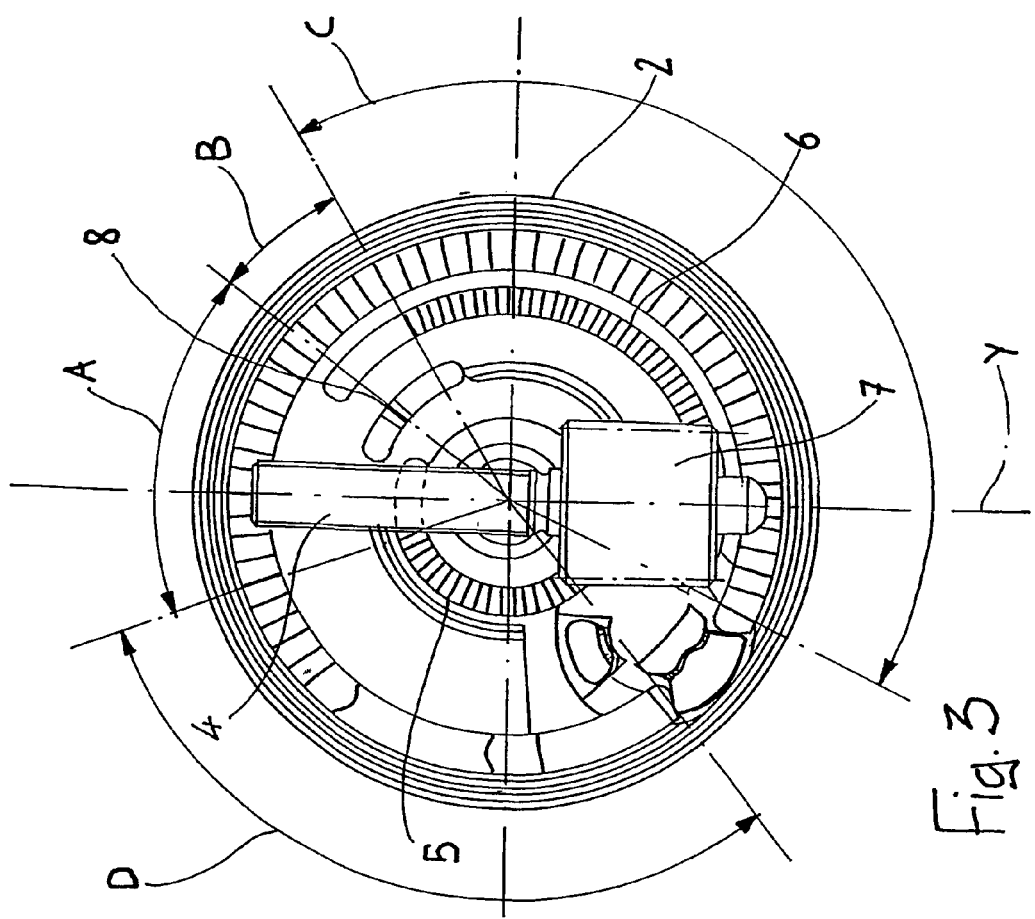

The tooth 8, as well as the crown wheel sectors 5, 6, are spaced apart circumferentially. The angular distances between the tooth 8 and the respective ends of the sectors 5, 6 closest to the tooth are indicated A and B in FIG. 3 and the angular amplitudes of the crown wheel sectors 6 and 5 are indicated C and D.

For a first angular portion and a second angular portion which are consecutive and correspond, respectively, to the sectors 5 and 6, the pinion 7 is thus rotated by the knob 2 with a first transmission ratio and with a second transmission ratio T1, T2, respectively (defined as the ratio between the diameter of the pinion 7 and the diameter of the respective crown wheel sector 5, 6).

According to a preferred characteristic of the device according to the invention, the transmission ratio T1 is selected so as to be approximately three times the transmission ratio T2. Moreover, the transmission ratio, indicated T3, between the tooth 8 and the pinion 7 is selected so as to have an intermediate value between the transmission ratios T1 and T2.

The graph of FIG. 4 shows the curve of the temperature (on the ordinate) as a function of the angular rotation band provided on the knob 2 (on the abscissa).

The angular amplitude D is representative of the band for the selection of the temperature within the preselected range of approximately 30° C. to 70° C. and the slope of the curve (FIG. 4) in this portion is correlated directly and proportionally with the transmission ratio T2 with which the operating member 4 is rotated by the knob 2 along the crown wheel sector 5.

The angular amplitude C, on the other hand, is representative of the angular band required to set the temperature for the opening of the main gas duct at a temperature lower, by a suitable safety margin, than the minimum temperature of use of the apparatus. In this portion, the slope of the curve is correlated directly and proportionally with the transmission ratio T1 by which the operating member 4 is rotated by the knob 2 along the crown wheel sector 6.

It will be noted that the change in transmission ratio enables a considerably smaller angular band to be achieved for lighting and shutting off (angular distance C) than can be achieved with equal transmission ratios (equal to T2).

All of the above-mentioned functions implemented in the knob 2 can thus be set by the user within a single rotation of the knob. A preferred value for the angular rotation of the knob corresponding to the sum of the angular distances and amplitudes A, B, C, and D is between 225° and 340° and is preferably selected so as to be 315°.

Moreover, the temperature selection band (the angular amplitude D) can advantageously be kept within an angular rotation of the knob 2 on the order of about 150° so as to permit an adequate resolution and greater sensitivity in the setting of the temperature values by the user. The angular amplitude C is consequently reduced to a value of about 120° by virtue of the provision of the transmission ratio T1.

It will also be noted that the changeover of the pinion 7 between its meshing with the crown wheel sector 6 and with the sector 5 takes place via an intermediate meshing with the tooth 8 so as to permit smoother and more continuous rotation of the knob 2. In fact, the pinion 7 is arranged not to mesh with both of the crown wheel sectors 5, 6 at the same time but changes over between the sector 6 and the tooth 8 and between the tooth 8 and the sector 5 by respective successive meshings. The discontinuity of rotation due to the different peripheral velocities of the mutually meshed teeth during the instantaneous change of transmission ratio is thus considerably reduced. The provision of the intermediate transmission ratio T3 thus reduces the effects due to the discontinuity of rotation and advantageously enables a ratio T1 approximately three times the ratio T2 to be achieved.

The invention thus solves the problem set, achieving the advantages mentioned above.

In particular, the knob adjustment device of the invention enables all of the adjustment and temperature-selection functions provided for to be incorporated in the valve unit 1 with an operative angular band less than or equal to one complete rotation of the knob 2, for easier and quicker use by the user, at the same time ensuring an adequate degree of resolution and sensitivity for the user in the selection of the preselected temperature value.

The invention claimed is:

1. A knob adjustment device for adjusting the temperature in valve units for water-heating apparatus, the valve units having a rotatable knob and an operating member, the device comprising:

a geared transmission interposed between the knob and the operating member of the valve unit in order to transmit a rotary movement to the operating member about a first axis as a result of a rotation of the knob, the geared transmission including a reduction mechanism with a variable transmission ratio such that, for a first and a second angular portion of the rotation of the knob, the operating member is rotated with respective and different first and second transmission ratios ($T_1$, $T_2$), the reduction mechanism including (i) a pinion fixed for rotation with the operating member, (ii) a pair of crown wheel sectors having face teeth, coaxial with and fixed for rotation with the knob, the crown wheel sectors being concentrically extended, with respective different diameters and respective, circumferentially spaced apart ends, and being able to mesh with the pinion, and (iii) at least one intermediate tooth radially disposed in a position between the crown wheel sectors and circumferentially disposed in a position between the spaced apart crown wheel sector ends, and able to mesh with the pinion.

2. A knob adjustment device for adjusting the temperature in valve units for water-heating apparatus, the valve units having a rotatable knob and an operating member, the device comprising:

a geared transmission interposed between the knob and the operating member of the valve unit in order to transmit a rotary movement to the operating member about a first axis as a result of a rotation of the knob, the geared transmission including a reduction mechanism with a variable transmission ratio such that, for a first and a second angular portion of the rotation of the knob, the operating member is rotated with respective and different first and second transmission ratios ($T_1$, $T_2$) the reduction mechanism including (i) a pinion fixed for rotation with the operating member, (ii) a pair of crown wheel sectors having face teeth, coaxial with and fixed for rotation with the knob, the crown wheel sectors being concentrically extended, substantially as extensions of one another with respective different diameters, and being able to mesh with the pinion, and (iii) at least one intermediate tooth radially disposed in a position between the crown wheel sectors and able to mesh with the pinion, the crown wheel sectors and the at least one intermediate tooth are spaced apart circumferentially in a manner such that the pinion meshes alternatively with one or the other of the respective crown wheel sectors or with the at least one intermediate tooth.

3. The device according to claim 1, in which the at least one intermediate tooth extends concentrically with the crown wheel sectors along an arc with a diameter having an intermediate value between the diameters of the crown wheel sectors.

4. The device according to claim 1, in which the crown wheel sectors and the at least one intermediate tooth have a circumferential extent such that the operating member is rotated for a first angular portion and a second angular portion corresponding with the respective first and second transmission ratios ($T_1$,$T_2$), the first transmission ratio ($T_1$)

between the first crown wheel sector and the pinion being approximately three times the second transmission ratio (T2) between the second sector and the pinion.

5. The device according to claim 4, in which the transmission ratio between the intermediate tooth and the pinion is an intermediate ratio ($T_3$) between the first and second transmission ratios ($T_1,T_2$) of the crown wheel sectors.

6. The device according to claim 2, in which the at least one intermediate tooth extends concentrically with the crown wheel sectors along an arc with a diameter having an intermediate value between the diameters of the crown wheel sectors.

7. The device according to claim 2, in which the crown wheel sectors and the at least one intermediate tooth have a circumferential extent such that the operating member is rotated for a first angular portion and a second angular portion corresponding with the respective first and second transmission ratios (T1,T2), the first transmission ratio (T1) between the first crown wheel sector and the pinion being approximately three times the second transmission ratio (T2) between the second sector and the pinion.

8. The device according to claim 7, in which the transmission ratio between the intermediate tooth and the pinion is an intermediate ratio ($T_3$) between the first and second transmission ratios ($T_1,T_2$) of the crown wheel sectors.

* * * * *